United States Patent [19]

Lanzerath et al.

[11] Patent Number: 4,866,831
[45] Date of Patent: * Sep. 19, 1989

[54] METHOD OF MAKING A SUPPORT FOR A SYNCHRONIZING RING

[75] Inventors: Gunter Lanzerath, Heidelberg; Helmut Patzer, Sandhausen; Rudolf Muller, Ladenburg, all of Fed. Rep. of Germany

[73] Assignee: Borg-Warner Automotive, Inc., Troy, Mich.

[ * ] Notice: The portion of the term of this patent subsequent to Oct. 13, 2004 has been disclaimed.

[21] Appl. No.: 129,193

[22] Filed: Dec. 7, 1987

Related U.S. Application Data

[62] Division of Ser. No. 869,758, Jun. 2, 1986, Pat. No. 4,742,723.

[30] Foreign Application Priority Data

Jun. 3, 1985 [DE] Fed. Rep. of Germany ....... 3519811

[51] Int. Cl.$^4$ ............................................. B21D 53/28
[52] U.S. Cl. .................................................. 29/159.2
[58] Field of Search .................... 29/159.2; 192/53 E, 192/53 F; 74/339

[56] References Cited

U.S. PATENT DOCUMENTS

| 3,366,208 | 1/1968 | Kelbel | 192/53 F |
| 4,698,889 | 10/1987 | Patzer et al. | 29/159.2 |

FOREIGN PATENT DOCUMENTS

| 1535343 | 8/1968 | France . | |
| 120433 | 7/1983 | Japan | 29/159.2 |

Primary Examiner—P. W. Echols
Attorney, Agent, or Firm—Robert L. Zieg; James J. Jennings; James A. Geppert

[57] ABSTRACT

A support is disclosed for a synchronizing ring for the synchronization of gears, in which the stops for coupling to the clutch are formed from lugs which are bonded integrally to the sprocket ring or ring-shaped core. The support is produced economically by a method of punching a flat ring and drawing it into a conical ring-shaped part with an outer radial edge, forming the part and punching an outer sprocket and lugs in the edge, bending the lugs alongside the part to form stops and stamping the tooth profile for the sprocket. The flat ring may also be punched with inwardly extending lugs which are then bent upwardly along the body to form the stops.

3 Claims, 2 Drawing Sheets

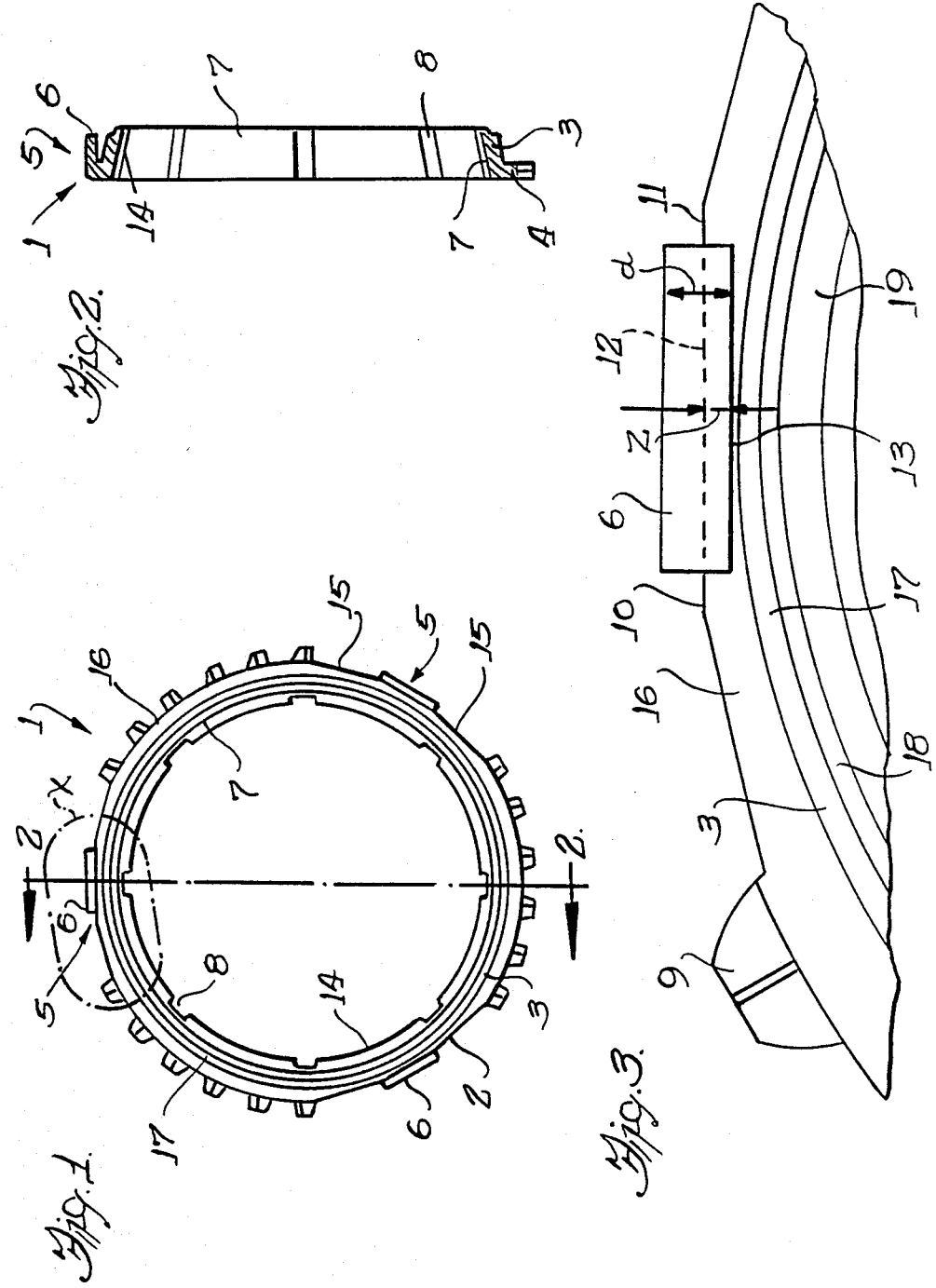

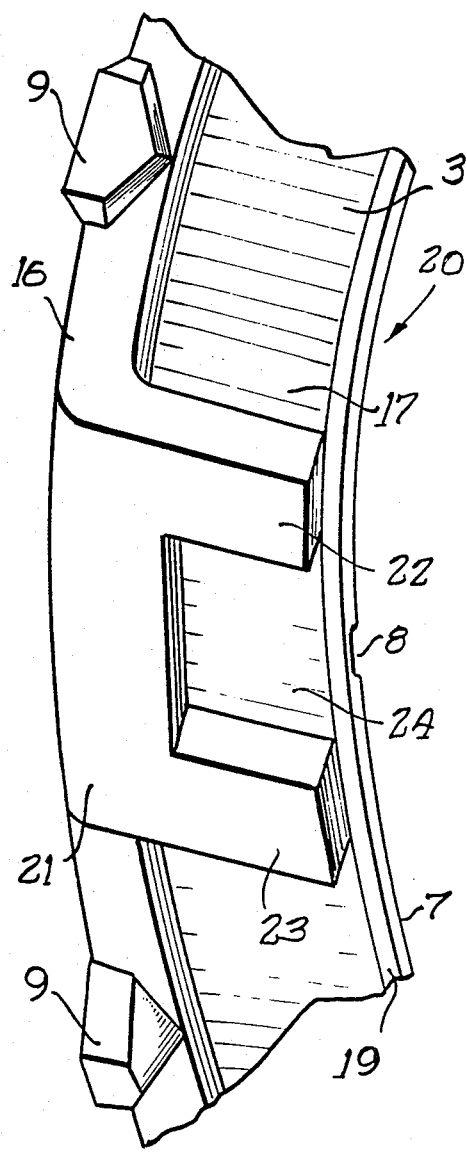
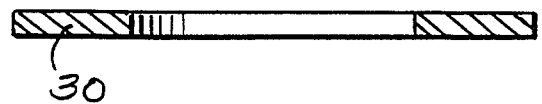
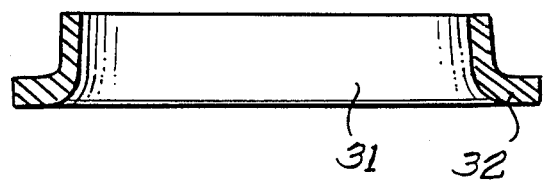
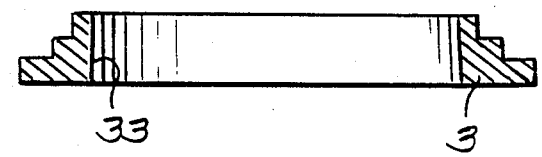
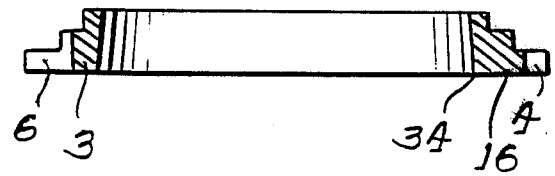
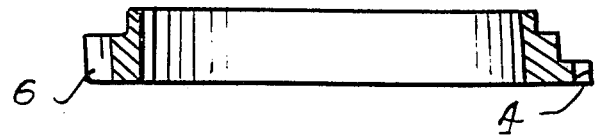

METHOD OF MAKING A SUPPORT FOR A SYNCHRONIZING RING

This is a division of application Ser. No. 869,758 filed June 2, 1986, now U.S. Pat. No. 4,742,723.

BACKGROUND OF THE INVENTION

The present invention relates to a support for a synchronizing ring for gear synchronization, with a ring-shaped body having a conical contact surface, an outer sprocket and stops for coupling to the clutch.

Various types of support are known for synchronizing rings, these supports differing especially by the selection of the material therefor. As far as design is concerned, the supports consist substantially of a ring-shaped body, which has a sprocket on the outside for positive locking with the corresponding clutch. There are several lugs or pockets, usually three displaced by 120°, on the outside of the ring-shaped body serving as stops for locking of the synchronizing ring to the clutch.

Synchronizing rings of this type are usually produced by a casting process, however, it has been proposed to produce synchronizing rings by a punching and drawing method. For example, French Pat. No. 1,535,343 describes such a method, wherein first a hat-shaped object is produced by the deep-drawing method, the edge of which is provided with a sprocket in the subsequent process steps and the bottom of which is removed. In the last process step, three pockets are formed in the ring-shaped body, these pockets serving as stops for coupling to the gear-shift sleeve. However, this synchronizing ring could not fulfill all the requirements qualitatively that were fulfilled by a synchronizing ring produced by the casting method. Thus, for example, the transition from the ring-shaped body to the sprocket ring has a rounded portion on the inside, which is undesirable because it cannot be utilized for the synchronization process. The pockets also reduce the conical contact surface.

The task of the present invention is to provide a support for a synchronizing ring, the support having an extremely simple structure which can be produced economically, and the stops are to be designed in such a way that they do not have an adverse influence on the synchronization surface.

SUMMARY OF THE INVENTION

According to the present invention, the problem of the above task is solved in the case of a support of the type mentioned at the outset by forming the stops from lugs that are integrally bound to the sprocket ring or to the ring-shaped body and lie in the same direction as the surface of the ring-shaped body. Lying in the same direction means here that the lugs extend in the axial direction and run tangentially to the surface of the ring-shaped body. They may lie entirely or only partially against the surface. In the case of this type of stop, the production of the synchronizing ring is possible only by using a punching, deep-drawing, bending, and stamping process. The transition from the ring-shaped body to the sprocket ring is formed as a sharp corner by subjecting the ring-shaped body to compression and calibration.

In order to be able to form the lugs on the sprocket ring, a free space is provided next to each lug where the tools can be introduced during working. It is expedient if every other tooth were removed from the sprocket ring. Furthermore, it is advantageous when the material of the sprocket ring is removed to form the free space on the left and right of each lug the removal being of such an extent that the distance between a line that connects the remaining surfaces and the edge of the conical ring-shaped portion is about half of the thickness of the lugs. If necessary, the lugs can also be provided with pockets.

In the method for the production of the synchronizing ring with lugs on the sprocket ring, first a ring is punched from a deep-drawable material strip. This ring is drawn to a conical ring-shaped configuration with an outer edge. This is followed by axial forming and sizing of the conical ring-shaped part to the ring-shaped body with simnultaneous sizing of the conical contact surface. Then the sprocket and the stops or lugs are punched from the outer edge, followed by bending of the stops and finally, the tooth profiles will be pressed to their final form. The forming and sizing of the tooth profiles leads to a sufficient surface hardness of the teeth without subsequent machining, since when the slanting top parts are stamped, the surface finish is sufficiently hard, especially on the tooth profile. This method is extremely simple and is superior to all other methods known in the art. The pushing back of the conical ring part with sizing of the contact frictional cone is of special importance. As a result of this, the transition between the ring-shaped body and the sprocket ring will be a very sharp corner, so that the friction lining to be applied can be inserted right up to the corner. Thus, the full width of the ring-shaped body is available for the synchronization process.

In the method of production of the synchronizing ring, in which the lugs are integrally bound to the ring-shaped body, first a ring is prestamped, the ring having inward extending lugs on its inside edge. The ring is drawn to a conical ring-shaped part and the lugs are brought to lie against the ring-shaped part by bending. Then the conical ring-shaped body is formed by final axial pressing with simultaneous forming and sizing of the conical friction cone. Finally, the sprocket wheel is punched and the tooth profile is stamped and cut.

DESCRIPTION OF THE DRAWINGS

The following are shown:

FIG. 1 shows a top plan view of the synchronizing ring;

FIG. 2 shows a section through the synchronizing ring taken on the line 2—2 of FIG. 1;

FIG. 3 shows enlarged detail X of FIG. 1;

FIG. 4 shows a section of a synchronizing ring with a pocket in the lug; and

FIGS. 5 to 9 show schematically the individual process steps in the production of the synchronizing ring.

DESCRIPTION OF THE PREFERRED EMBODIMENT

Synchronizing ring 1 shown in FIGS. 1 and 2 has a core 2, which consists substantially of a ring-shaped body 3 with a toothed rim 4. Since core 2 is to be produced by a punching and stamping process, it was not possible to attach the usual stop lugs onto the ring-shaped body 3. Also, the ring-shaped body 3 should not be interrupted by pockets for coupling purposes, as this would reduce the synchronizing surface. For this reason, stops 5 are produced which consist of bent lugs 6. The toothed rim 4 is interrupted in three places and, instead of the omitted teeth, projecting lugs 6 are present which, when bent over, provide the necessary stops for the synchronizing ring. The lugs lie tangentially to surface 17 (FIGS. 3 and 4) of the ring-shaped body 3.

In order to facilitate the bending process, a free space 15 (FIG. 1) is provided next to each lug. This is achieved by removing the neighboring teeth. In addition, a part of the spline rim 16 is removed. The contact surface 14 of the synchronizing ring is formed by a friction lining 7 consisting of paper friction material, the friction lining being provided with axial grooves 8.

Section X of FIG. 1 is shown enlarged in FIG. 3. Here the shape of the individual teeth 9 can be clearly recognized. However, above all it is intended to show the position of lugs 6. The material of the spline rim 16 is also removed on either side of each lug 6. The surfaces 10 and 11 produced in this way run parallel to the outside surface of lugs 6. If one connects the two surfaces 10 and 11 with an imaginary line 12, then the distance Z between line 12 and edge 13 of the ring-shaped body 3 is about half of the lug thickness d. This dimensional relationship is favorable when bending lugs 6.

Lugs 6 lie in an axial direction, tangentially to surface 17 of ring-shaped body 3. The edge chamfer is designated as 18, and 19 designates the leading edge of ring-shaped body 3. The friction lining is not shown in FIG. 3.

FIG. 4 shows a portion of a synchronizing ring 20 in a perspective view. Friction lining 7 with grooves 8 is placed on ring-shaped body 3. Splined rim 16 is provided with teeth 9. Lugs 21 lie against surface 17 of ring-shaped body 3 and are formed in the shape of forks having two prongs 22 and 23, a pocket 24 lying between the prongs.

The method for the production of the synchronizing ring with the lugs on the spline rim 16 is carried out in the steps shown in FIGS. 5 to 9. First, a ring 30 is blanked from a deep-drawable strip of material (FIG. 5). Using a deep-drawing process, this ring 30 is drawn to a conical ring-shaped part 31 with an outer edge 32 (Figure 6). Then the conical ring-shaped part 31 is formed and sized in the axial direction and, at the same time, the conical contact surface 33 is also formed and sized (Figure 7). Then the ring-shaped body 3 is ready. It should be noted that, during the forming and sizing, a ring-shaped body 3 is produced having a sharp edge 34 at the transition from the ring-shaped body 3 to the splined rim 16. Then tooth rim 4 and lugs 6 are blanked out (FIG. 8). The lugs 6 are subsequently bent and the chamfers are pressed to their final form (FIG. 9).

The production of a synchronizing ring with lugs on the ring-shaped core 3 proceeds substantially according to the principle of the above method. However, it should be observed when ring 30 is prepunched, this must be punched with lugs lying toward the inside and that the bending of these lugs must be carried out before forming the conical ring-shaped core 3 and forming and sizing of the friction contact cone 33.

The new support for a synchronizing ring is produced by an extremely simple method utilizing cold forming without the use of cutting machines. Experiments showed that the new support fulfills its task completely.

We claim:

1. Method for the production of a support for a synchronizing ring for gear synchronization comprising the steps of:
   prepunching a ring from a deep-drawable material strip; drawing the ring into a conical ring-shaped part with an outer radial edge;
   forming the conical ring-shaped part in an axial direction to provide a ring-shaped core having an outer surface and a conical friction contact surface;
   punching an outer sprocket and lugs having opposite edges from the outer radial edge ;
   bending the lugs to extend in the same direction as said outer surface of the ring-shaped core, resulting in stops for coupling the support to a synchronizing clutch; and stamping and cutting a tooth profile for the sprocket.

2. A method as set forth in claim 1, including the step of removing material from the outer radial edge adjacent the opposite edges of each lug.

3. Method for the production of a support for a synchronizing ring for gear synchronization comprising the steps of:
   prepunching a ring with inwardly extending lugs from a deep-drawable material strip;
   drawing the ring into a conical ring-shaped part with an outer radial edge;
   bending the lugs to extend along the part thereby forming stops for coupling the support to a synchronizing clutch;
   forming the conical ring-shaped part in an axial direction to provide a ring-shaped body having a conical friction contact surface;
   punching an outer sprocket from the outer radial edge; and
   stamping and cutting a tooth profile for the sprocket.

* * * * *